(12) United States Patent
Barker

(10) Patent No.: US 6,667,089 B1
(45) Date of Patent: Dec. 23, 2003

(54) COMPOSITE PANEL AND METHOD OF MANUFACTURE

(75) Inventor: Tom Barker, London (GB)

(73) Assignee: B Consultants Limited, London (GB)

( * ) Notice: Subject to any disclaimer, the term of this patent is extended or adjusted under 35 U.S.C. 154(b) by 0 days.

(21) Appl. No.: 09/538,778

(22) Filed: Mar. 30, 2000

(30) Foreign Application Priority Data

Mar. 31, 1999 (GB) ............................................. 9907422

(51) Int. Cl.[7] .................................................. B32B 3/00
(52) U.S. Cl. .......................... 428/73; 428/116; 428/131; 428/297.4; 362/147; 362/153; 52/307; 52/309.15; 52/793.1
(58) Field of Search ................................ 428/116, 117, 428/118, 73, 131, 297.4, 480, 457; 362/806, 145, 147, 153; 52/306, 307, 309.14, 309.15, 309.3, 782.1, 783.1, 793.1; 264/241, 257, 258; 156/60, 242

(56) References Cited

U.S. PATENT DOCUMENTS

| 4,573,304 A | | 3/1986 | Meiyal ......................... 52/807 |
| 5,106,668 A | * | 4/1992 | Turner et al. |
| 5,888,612 A | * | 3/1999 | Needham et al. |
| 6,348,960 B1 | * | 2/2002 | Etori et al. |

FOREIGN PATENT DOCUMENTS

| GB | 2150168 A | 6/1985 | ............. E04C/2/50 |
| GB | 2316651 A | 3/1998 | ............. B32B/3/12 |

OTHER PUBLICATIONS

UK Patent Office Search report for priority application GB 9907422.1.

\* cited by examiner

*Primary Examiner*—Cathy Lam
*Assistant Examiner*—Wendy Boss
(74) *Attorney, Agent, or Firm*—Kilyk & Bowersox, P.L.L.C.

(57) ABSTRACT

A composite panel (10) and a method for forming the panel are described. The panel (10) comprises an inverted tray (14) of composite material such as fibre reinforced plastic. A transparent or translucent surface layer (12) is provided on the top surface (16) of the tray (14). A block of honeycomb (20) with a backing sheet (22) is bonded within the cavity defined by the top surface (16) and the side walls (18) of the tray (14). The panel may be illuminated by using an electroluminescent film as the backing sheet (22) or by placing LEDs (30) in the cells (34) of the honeycomb material (20). The composite panel (10) may be used as flooring, to create partition walls, or simply as decorative panels.

10 Claims, 3 Drawing Sheets

COMPOSITE PANEL AND METHOD OF MANUFACTURE

BACKGROUND OF THE INVENTION

The present invention relates to a composite panel for use as flooring, partition walls or decorative wall panels. The panel is lightweight but hardwearing and can incorporate colours and lighting devices to provide special effects. The panel is particularly useful in museums, exhibitions etc where it is desirable to provide a versatile medium to construct different layouts with striking visual effects.

It is well known how to produce composite materials to provide a combination of properties, such as high strength and low weight. For example, aircraft cabin floors commonly contain composite panels having a honeycomb material sandwiched between other layers. However, the material is not particularly hardwearing and must therefore be covered by further protective layers in use and accordingly is hidden from view.

SUMMARY OF THE INVENTION

The present invention provides a composite panel comprising a layer of fibre reinforced plastic (FRP) material, a block of honeycomb material formed of perforated sheet having one side secured to one side of the FRP layer, a backing layer attached to the other side of the honeycomb material and a resin coating on the other side of the FRP layer, wherein the fibre reinforced plastic and the resin coating are at least partially transparent or translucent.

In this way, a strong and versatile panel is provided which can be used to create flooring and walls. Additionally, light can pass through the panel, allowing the honeycomb material to be at least partly visible.

Preferably, the FRP layer forms the base of a tray-shaped structure which further comprises side walls formed of FRP material and depending from the FRP layer so as to define a cavity within which the honeycomb material is located.

Preferably, the honeycomb material is spaced from the side walls of the tray, to allow the escape of air during the curing process from the honeycomb and so that loads applied to the honeycomb material are not transmitted to the side walls of the tray.

Conveniently, the spacing between the honeycomb and the side walls may be covered by fibre reinforced tape.

In a preferred embodiment, the honeycomb material is formed from aluminum and the resin coating may be epoxy, polyester or a mixture of the two.

To provide visual effects, one or more colours or tints may be applied to the fibre reinforced plastic material.

The backing layer attached to the honeycomb may consist of fibre reinforced plastic, or electroluminescent film.

To allow pictures and graphics to be displayed on the panel, an illumination device may be provided in each of a plurality of the cells of the honeycomb material and the LEDs may be secured to the backing material.

The illumination devices may all produce light of the same colour. Alternatively, three different colour illumination devices may be used or tricolour illumination devices, each capable of displaying three different colours, may be used.

The illumination devices may be LED's.

Preferably, the honeycomb material and/or the backing layer protrudes slightly out of the cavity so that in use loads may be applied against the honeycomb material without transmission to the side walls of the tray.

If it is desired to use the panel in an exterior application, a sealing layer may be applied to the side of the backing layer remote from the honeycomb material to seal the panel.

In another aspect of the invention, there is provided a floor made up of a plurality of composite panels of the aforementioned type. Such a floor may be supported on pedestal supports with resilient bearing pads which bear against the backing material and not the side walls of the tray (if present).

In yet another aspect of the invention, there is provided a wall made up of a plurality of composite panels of the aforementioned type.

In yet another aspect of the invention, there is provided a method providing a mould with a mould cavity, lining the base of the mould cavity with fibre reinforced plastic (FRP) material to form an FRP layer, cold curing the fibre reinforced plastic material, covering the FRP layer with adhesive, securing honeycomb material produced from perforated sheet to the FRP layer with the adhesive, the honeycomb material having a backing layer, removing the FRP layer with the attached honeycomb material from the mould cavity, inverting the FRP layer and applying a resin coating to the other side of the FRP layer, wherein the fibre reinforced plastic material and the resin coating are at least partially transparent or translucent.

Preferably, the method also includes the step of lining the sides of the mould cavity with FRP material to form a tray-shaped structure with a base and side walls.

To provide visual effects, the method may include the step of applying one or more colours or tints to the mould before it is lined with the fibre reinforced plastic material.

The backing material applied to the honeycomb may consist of fibre reinforced plastic or an electroluminescent film.

To provide further visual effects, the method may include the step of placing an illumination device in each of a plurality of cells in the honeycomb material.

The method may further comprise the step of applying a sealing layer to the back of the panel to seal it, making it suitable for exterior applications.

The invention will now be described in detail, by way of example only, with reference to the accompanying drawings.

DETAILED DESCRIPTION OF THE PREFERRED EMBODIMENTS

A composite panel 10 in accordance with an embodiment of the present invention is in the form of a square tile having a large surface area and a comparatively small depth. A typical tile is approximately 0.5 m along each side and approximately 3 cm thick. However, a rectangular tile or other shape which can be conveniently tessellated may also be produced.

Figure 1:
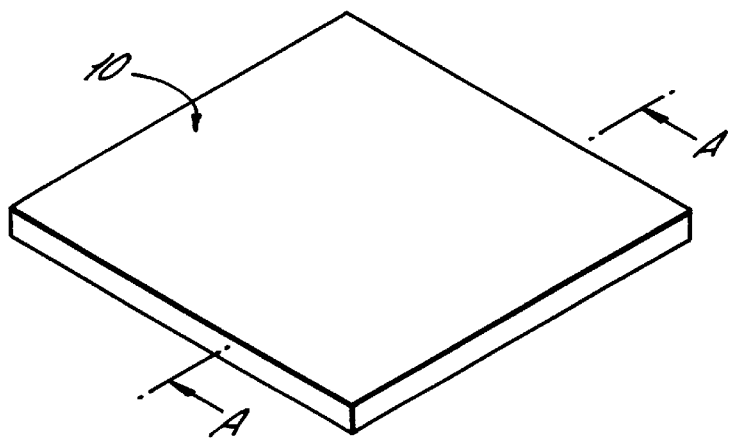
FIG. 1 is a perspective view of a composite panel in accordance with the present invention.
Figure 2:
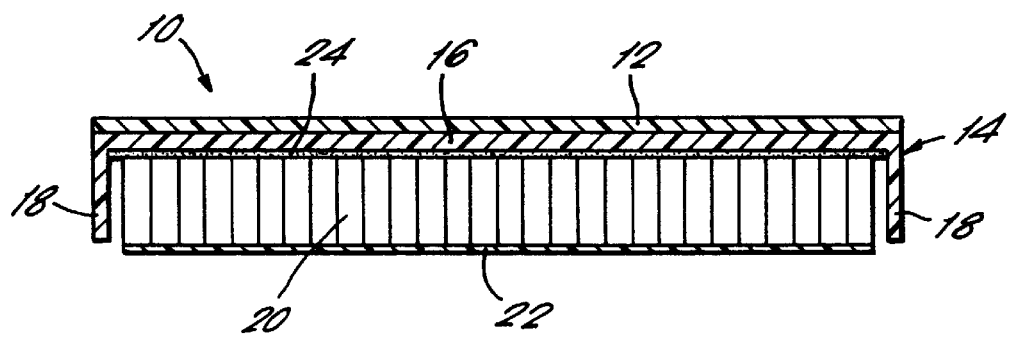
FIG. 2 is a cross-section of the panel of FIG. 1 of along the line of A—A.

As best seen in FIG. 2, the panel has an upper surface 12 which is at least partly transparent or translucent and may be coloured as described further below. The upper surface 12 is preferably formed of epoxy resin or polyester resin. This provides a hardwearing layer which is suitable as a floor surface and can be walked upon.

Beneath the upper surface 12 is an inverted tray-shaped structure 14 of composite material, such as glass fibre reinforced plastic. This tray 14 has a top surface 16 and four side walls 18.

Within the cavity defined by the composite tray 14 is a block of honeycomb material 20. The honeycomb material 20 is secured to the underside of the top surface 16 of the composite tray 14 by adhesive resin 24. The honeycomb material 20 is spaced inwardly from the composite side walls 18 for the reasons discussed below. The honeycomb material 20 is provided with a backing sheet 22 which may be of fibre reinforced plastic or other material as discussed below. The honeycomb material 20 and backing sheet 22 are preferably dimensioned to protrude slightly out of the cavity defined by the composite tray 14. The honeycomb material 20 is preferably constructed from perforated aluminum, i.e aluminum sheet with a number of minute pores formed in the metal.

Although this is a preferred embodiment, a tray 14 with side walls 18 is not essential. The panel 10 could consist of simply the top surface 16, with the honeycomb material 20 and backing sheet 22 secured to one side and the upper resin surface 12 on the other.

Figure 3:
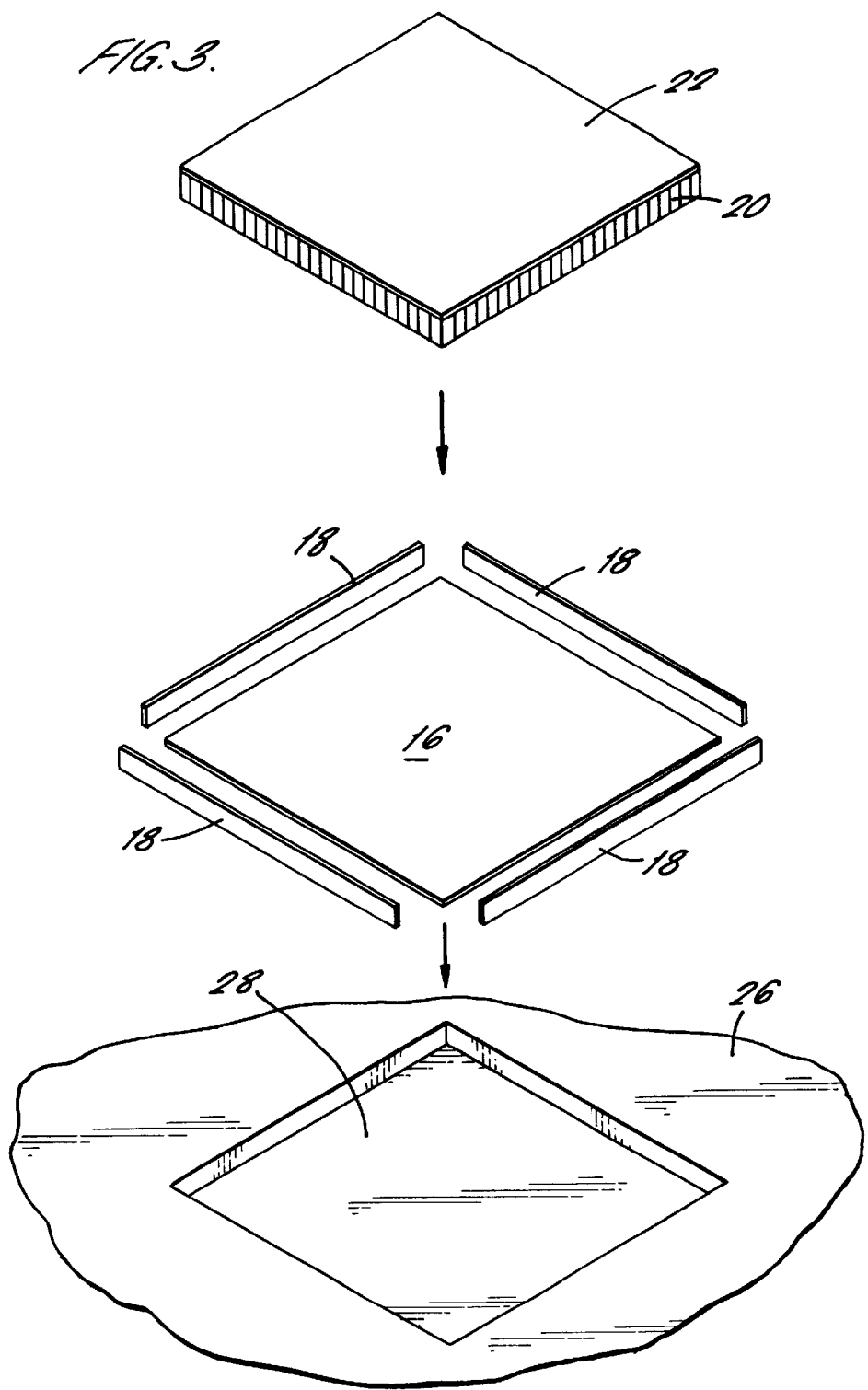
FIG. 3 is a schematic diagram showing the initial steps in manufacture of the panel of FIGS. 1 and 2.
Figure 4:
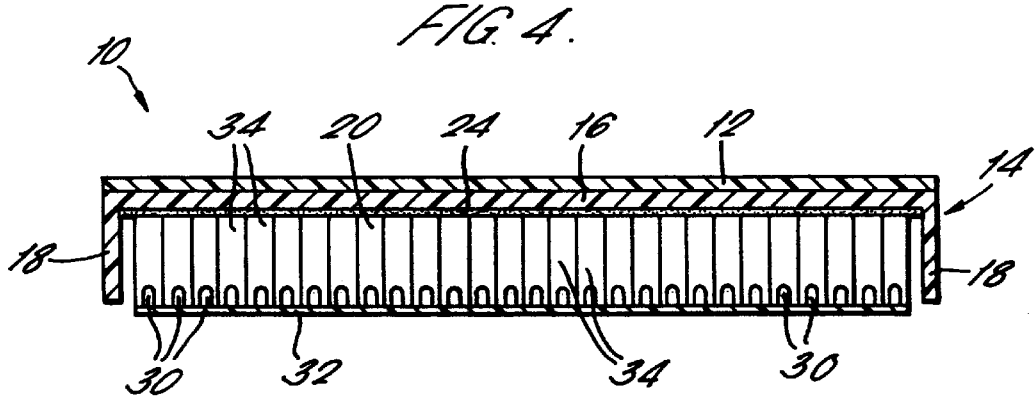
FIG. 4 is a cross-section similar to FIG. 2 showing a panel incorporating an LED matrix.

The panel 10 may be manufactured according to the following process partly illustrated in FIG. 3. First, a mould 26 having a shallow cavity 28 is provided, for example of Formica (RTM), with a degreaser lining the cavity. The base and sides of the cavity 28 are lined with fibre reinforced plastic to create the tray 14. This is typically done by hand and the fibre reinforced plastic is cured in a cold cure process.

If the panel 10 is being manufactured without the sidewalls 18, then only the base of the cavity is lined to form the top surface 16.

After curing of the fibre reinforced plastic 14, the base 16 is coated with an adhesive resin 24. A block of honeycomb material 20, typically with a conventional preformed fibre reinforced plastic backing sheet 22, is placed in the composite tray 14, the open end of the honeycomb contacting the adhesive resin 24. The honeycomb block 20 is smaller than the inside dimensions of the tray 14 so that the edges of the honeycomb are spaced from the sides of the composite tray 14 (or from the sides of the mould 26 if the side walls 18 are not present) all the way around. The adhesive resin 24 is then cured, during which process heat is evolved. This heat causes air trapped in the cells of the honeycomb material 20 between the backing sheet 22 and the adhesive resin 24 to expand and it has been found that this expansion leads to blistering of the panel surface, which is of course unacceptable in use. This problem has been overcome by using perforated material, such as aluminum, to form the honeycomb material 20, thereby allowing trapped air to escape from cell to cell and eventually out of the honeycomb material 20 at the edges, where it is spaced from the side walls of the composite tray 14 (or simply the sides of the mould 26).

When the honeycomb 20 has been securely bonded in place, the composite tray 14 is removed from the mould 26. The gap between the honeycomb material 20 and the side walls 18 of the composite tray may be covered with tape (not shown), such as structural composite tape, for convenience and to prevent dirt or debris entering the gap.

The panel 10 is inverted so that the base 16 of the composite tray 14 is uppermost. The upper surface is then coated with a layer of epoxy resin, or polyester resin, to provide the hardwearing upper surface 12.

Figure 5:
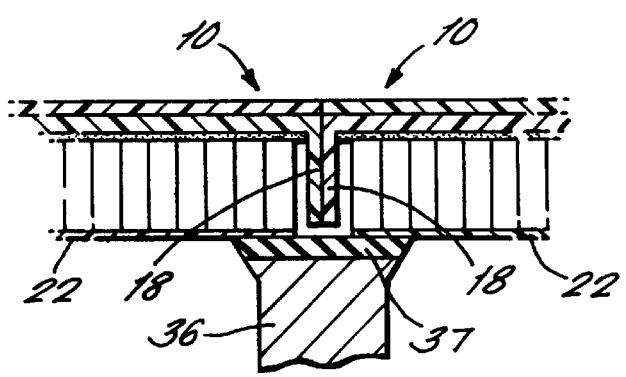
FIG. 5 shows how two adjacent panels may be supported as flooring.

As mentioned above, typically a panel 10 produced by this process is approximately 0.5 m along each side with a depth of approximately 3 cm, the top coat of epoxy resin being about 0.5 cm thick. A panel of these dimensions can be used as flooring. If it is supported on conventional pedestal supports 36 with resilient bearing pads 37 as shown in FIG. 5 at approximately 0.5 m spacing, the floor is able to withstand loads of 5 kN/m$^2$ and can cope with point loads, such as provided by high heeled shoes. When used in this way, the resilient bearing pads 37 of the pedestal supports 36 bear against the backing layer 22 of the honeycomb material 20 and not the side walls 18 of the composite tray 14, which would be vulnerable to delamination if exposed to high loads. Larger panels up to approximately 1 m×3 m can however conveniently be made by the same process.

Panels 10 can also be used, singly or grouped together as decorative panels hung on an existing wall or to themselves create a partition wall.

The upper layer 12 of epoxy resin, the composite tray 14 and the backing material 22 may all be made of transparent or translucent material so that light is able to pass through the panel 10. The honeycomb structure is then visible which in itself provides an interesting visual effect. However, further effects can be achieved by colouring and/or lighting the panel 10 as described below.

In order to colour the panel 10, the mould may be sprayed with a coloured or tinted resin before the composite tray 14 is layed within the mould. Sections of the mould may be masked off and sprayed with further colours to provide interesting visual effects.

Further interest can be provided by lighting the panel in various ways. Firstly, the panel may be backlit in a conventional manner in which light is shone through the panel 10 from the direction of the backing sheet 22 towards the upper (or front) surface 12. However, back lighting requires a certain amount of space to be provided behind the panel 10 to accommodate the back lighting apparatus and therefore the system is not suited to providing simple partition walls between adjacent spaces or in situations where space is limited for any other reason.

A second embodiment of lit panel employs a layer of electroluminescent film behind the block of honeycomb material 20. This consists of a double film metallic sheet which glows when a high frequency current is passed through it. The electroluminescent film may be used as the backing sheet 22 of the honeycomb 20, or may be placed behind the backing sheet, i.e. on the side remote from the honeycomb material 20. Incorporating the electroluminescent film into the panel 10 provides a glowing panel which is useful where light without depth is desired as a visual effect.

In a third embodiment, a more complex lighting system is provided which allows more complicated visuals to be displayed. In this embodiment, a matrix of illumination devices 30 is provided on a printed circuit board (PCB) 32. The devices 30 are conveniently LED's although any other type of lighting device could also be used. The LED's may be soldered to the PCB in a conventional manner or may be the more compact surface mounted type. The matrix is arranged so that each LED 30 sits in a cell 34 of the honeycomb material 20. An LED may be situated in every cell 34, or only some cells. When lit, each LED 30 floodlights its particular cell 34 due to internal reflection from the metallic walls. Since the cells 34 of the honeycomb material 20 are hexagonal, this effect provides a hexagonal pixel when viewed through the top surface 12 and the matrix of hexagonal pixels provided by the panel 10 can be used to display curves and represent pictures. Since the pixel size is relatively large and the resolution is low as compared with, say a TV, hexagonal pixels in fact make it easier to generate curves, and hence relatively complex graphics and pictures, than an equivalent size square pixel matrix. Typically, the size of one cell 34 in the honeycomb structure is in the range of 0.6 cm to 2.5 cm across, with a cell size of 1.3 cm to 2.5 cm being preferred.

The PCB 32 on which the LED's 30 are mounted can be used as the backing sheet 22 for the honeycomb material 20. A further layer of composite (not shown) may be provided across the back of the PCB 32 for added structural strength. Additionally, whilst it is simple to provide PCB's of approximately 0.5 m×0.5 m for use with a panel of equivalent size, if it is desired to manufacture a larger panel a number of separate PCB's may be used to make up the required area.

The LED's used may provide a single colour, typically red, to provide a monochrome display. Alternatively, the LED matrix may be made up of three different colours of LED, with only one colour being in one cell 34. Alternatively, tricolour LED's, which are single LED's able to display three different colours, may be used. With either of these latter two arrangements it is possible to provide a full colour display on the panel 10.

For additional visual effects, a symbol or logo may be added, for example, by transfer or screen printing to the upper surface 12 or on the backing layer 22 so that the symbol is illuminated or silhouetted when the panel 10 is used with a lighting device.

The panel 10 may also be provided with a back layer (not shown) of epoxy resin, polyester, or a mixture of the two, which seals the back of the panel 10, allowing it to be used in outdoor environments.

It will be apparent to those skilled in the art that the present invention provides an improved composite panel which is simple to manufacture, lightweight but very hard-wearing in use and allows lighting devices to be incorporated in it to produce visual effects with varying degrees of sophistication.

It will also be appreciated that variations and modifications can be made to the precise configuration described in the materials used without departing from the scope of the present invention.

What is claimed is:

1. A composite panel comprising a layer of fibre reinforced plastic (FRP) material, a block of honeycomb material, formed of perforated sheet, having one side secured to one side of the FRP layer, a backing layer attached to the other side of the honeycomb material, and a resin coating on the other side of the FRP layer forming an outer surface of the panel, wherein the FRP material layer and the resin coating are each at least partly transparent or translucent such that the block of honeycomb material is at least partially visible through the FRP material layer and the resin coating, wherein the FRP layer forms the base of a tray-shaped structure which further comprises side walls formed of FRP material and depending from the FRP layer so as to define a cavity within which the honeycomb material is located, wherein the honeycomb material is spaced from the side walls of the tray-shaped structure.

2. A composite panel as claimed in claim 1, wherein the spacing between the honeycomb material and the side walls of the tray is covered by fibre reinforced tape.

3. A composite panel comprising a layer of fibre reinforced plastic (FRP) material, a block of honeycomb material, formed of perforated sheet, having one side secured to one side of the FRP layer, a backing layer attached to the other side of the honeycomb material, and a resin coating on the other side of the FRP layer forming an outer surface of the panel, wherein the FRP material layer and the resin coating are each at least partly transparent or translucent such that the block of honeycomb material is at least partially visible through the FRP material layer and the resin coating, wherein the backing layer attached to the honeycomb comprises electroluminescent film.

4. A composite panel comprising a layer of fibre reinforced plastic (FRP) material, a block of honeycomb material, formed of perforated sheet, having one side secured to one side of the FRP layer, a backing layer attached to the other side of the honeycomb material, and a resin coating on the other side of the FRP layer, wherein the fibre reinforced plastic material layer and the resin coating are at least partly transparent or translucent, and wherein an illumination device is provides illumination in each of a plurality of cells of the honeycomb material.

5. A composite panel as claimed in claim 4, wherein the illumination device is secured to the backing material.

6. A composite panel as claimed in claim 4, wherein the illumination device produces light of the same color in each of the plurality of cells.

7. A composite panel as claimed in claim 4, wherein the illumination device provides three different colors of light.

8. A composite panel as claimed in claim 4 or claim 5, wherein the illumination device is able to produce light of three colors.

9. A composite panel as claimed in claim 4, wherein the illumination device comprises LEDs.

10. A composite panel comprising a layer of fibre reinforced plastic (FRP) material, a block of honeycomb material, formed of perforated sheet, having one side secured to one side of the FRP layer, a backing layer attached to the other side of the honeycomb material, and a resin coating on the other side of the FRP layer forming an outer surface of the panel, wherein the FRP material layer and the resin coating are each at least partly transparent or translucent such that the block of honeycomb material is at least partially visible through the FRP material layer and the resin coating, wherein the FRP layer forms the base of a tray-shaped structure which further comprises side walls formed of FRP material and depending from the FRP layer so as to define a cavity within which the honeycomb material is located, wherein the honeycomb material and/or the backing material protrude out of the cavity.

* * * * *